US005719999A

United States Patent [19]

Nishidai et al.

[11] Patent Number: 5,719,999

[45] Date of Patent: Feb. 17, 1998

[54] FUZZY CONTROL APPARATUS IN WHICH RULES CAN BE CHANGED, METHOD OF OPERATING SAME, CONTROL SYSTEM IN WHICH CHANGEOVER IS CONTROLLED BY FUZZY REASONING, AND METHOD OF CONTROLLING THE SAME

[75] Inventors: Hajime Nishidai; Nobutomo Matsunaga, both of Kyoto, Japan

[73] Assignee: Omron Corporation, Japan

[21] Appl. No.: 600,367

[22] Filed: Feb. 13, 1996

Related U.S. Application Data

[62] Division of Ser. No. 793,443, Dec. 13, 1991, Pat. No. 5,515,476.

[30] Foreign Application Priority Data

| | | | |
|---|---|---|---|
| Aug. 31, 1989 | [JP] | Japan | 1-223272 |
| Sep. 13, 1989 | [JP] | Japan | 1-237862 |
| Sep. 14, 1989 | [JP] | Japan | 1-236960 |
| Jul. 10, 1990 | [WO] | WIPO | PCT/US90/00887 |

[51] Int. Cl.[6] .......... G06G 7/00

[52] U.S. Cl. .......... 395/3; 395/51; 395/76; 395/900

[58] Field of Search .......... 395/3, 51, 61, 395/76, 900

[56] References Cited

U.S. PATENT DOCUMENTS

| | | | |
|---|---|---|---|
| 4,864,490 | 9/1989 | Nomoto et al. | 364/157 |
| 4,976,377 | 12/1990 | Higuchi et al. | 222/55 |

(List continued on next page.)

FOREIGN PATENT DOCUMENTS

| | | | |
|---|---|---|---|
| 268182 | 5/1988 | European Pat. Off. | G06F 7/70 |

OTHER PUBLICATIONS

"Proceedings of the 1987 American Control Conference," Hyatt Regency Hotel, Jun. 10–12, 1987, pp. 1662–1668.

"Fuzzy Logic Is Now In A Practical Phase Dedication, etc.," N. Inava, Nikkei Electronic, Jul. 1987 (vol, 426).

Proceedings of the 1987 American Control Conference, vol. 3, 10 Jun. 1987, Minneapolis, U.S. pp. 1662–1668, XP002003774–R.S. Ornedo, et al.: "Design and Experimental Evaluation of an Automatically Reconfigurable Controller for Process Plants", Abstract; Figures 1, 5.

Batur et al, "Self–organizing model based expert controller"; IEEE International Conference on Systems Engineering, p. 411–14 Aug. 1989.

Blanning, "Sensitivity analysis in hierachical fuzzy logic models"; Proceedings of the twenty–first annual Hawaii International Conference on System Sciences. vol. III. Decision Support and knowledge based systems track, pp. 471–476 Jan. 1988.

*Primary Examiner*—Tariq R. Hafiz

*Attorney, Agent, or Firm*—Dickstein Shapiro Morin & Oshinsky LLP

[57] ABSTRACT

In a fuzzy control apparatus in which a rule is capable of being changed during operation, a fuzzy reasoning output which prevails immediately prior to a rule change is stored when a rule change is made, and a fuzzy-control output is generated by combining, after the rule change, the stored fuzzy reasoning output which prevailed immediately prior to the rule change and a fuzzy reasoning output which prevails following the rule change. The ratio of the combination is altered in such a manner that, with the passage of time from the moment at which the rule change is made, there is a gradual decrease in a percentage of the fuzzy reasoning output which prevailed immediately prior to the rule change, and a gradual increase in a percentage of the fuzzy reasoning output which prevails following the rule change, in the fuzzy-control output. Upon passage of a predetermined time from the moment at which the rule change is made, the fuzzy reasoning output which prevails following the rule change is outputted as the fuzzy-control output. As a result, a sudden change in the output at the time of a rule change is prevented so that a smooth changeover can be carried out.

8 Claims, 14 Drawing Sheets

U.S. PATENT DOCUMENTS

| | | | |
|---|---|---|---|
| 5,001,640 | 3/1991 | Matsumoto et al. | 364/426.02 |
| 5,051,932 | 9/1991 | Inque et al. | 364/550 |
| 5,079,704 | 1/1992 | Sakai et al. | 364/424 |
| 5,084,754 | 1/1992 | Tomitaka | 358/424 |
| 5,167,005 | 11/1992 | Yamakawa | 395/3 |
| 5,168,549 | 12/1992 | Takagi et al. | 395/3 |
| 5,175,795 | 12/1992 | Tsuda et al. | 395/3 |

CONTROL OUTPUT
20
21
22
25
24
23
α
1-α
FUNCTION GENERATING CIRCUIT
OUTPUT CHANGEOVER CIRCUIT
13
16
14
15
12
TIMING CONTROL CIRCUIT
MODIFICATION TRIGGER
10
FUZZY CONTROL CIRCUIT
SETTING READ-IN
Sw
RULE-SETTING SWITCH UNIT
11
CONTROL INPUT

α = 0
31
32
CHANGE RULE?
Yes
No
33
α = 1
34
PRESENT OUTPUT VALUE → OH
35
CHANGE REASONING RULE
EXECUTE FUZZY REASONING OUTPUTTED COMPUTED VALUE → OF
36
OUTPUT = α·OH-(1-α)·OF
37
38
α = 0 ?
No
Yes
(α − Δα) → α
39
40
α≦0 ?
Yes
No
41
α = 0

TO MIN CIRCUIT 72
M F G
C1
C2
C3
110
FROM MIN CIRCUIT 71
COMPAR-ATOR
101
100
+V
102
RULE-CHANGE INHIBITING CONTROL
85
DATA LATCH
DIGITAL SWITCH UNIT
75d
75a
90a
92
91
TO MFC 70a
VLA
SWITCH ARRAY
DECODER
L1
L2
L3
L4
E1
E2
E3
-E1
-E2
-E3
0V
93
LABEL VOLTAGE GENERATOR
FROM ANALOG BIAS CIRCUIT
Q
D
G
80a
80b
80c
80d
80
R1
R2
R3
R4
Sw1
Sw2
Sw3
Sw4
DIGITAL SWITCH UNIT

Vcc
VOUT
VIN
VLA
-Vcc
Q1
Q2
Q3
Q4
Q6
Q7
Q8
Q9
Q10
Q11
Q12
Q13
R1
R2
RL
V1
V2
I1
I2
I3
I4
Io
51
52
53
54
55
56
59

115a
SL
OL
VL
115A
SWITCH MATRIX
114A
VOLTAGE-DISTRIBUTION GENERATING CIRCUIT

NO DESIGNATION
114a
114b
114c
1.7 3.3 5.0V
NL
NM
NS
ZR
PS
PM
PL
OL
115b
DE-CODER
116A
$C_1$
$C_2$
$C_3$
5V
0V

MODE SETTING UNIT
152
FUZZY REASONING CIRCUIT
151
INPUT CIRCUIT
154
153
CO-EFFICIENT SETTING UNIT
150
CONTROLLED OBJECT
155
DETECTOR
140
141
CO-EFFICIENT UNIT
142
CO-EFFICIENT UNIT
145
CO-EFFICIENT UNIT
131
CONTROL APPARATUS
132
CONTROL APPARATUS
135
CONTROL APPARATUS
130
TARGET VALUE

| x2 \ x1 | NL | ZR | PL |
|---|---|---|---|
| PL | PM | | ZR |
| ZR | | ZR | |
| NL | ZR | | ZR |

| x2 \ x1 | NL | ZR | PL |
|---|---|---|---|
| PL | ZR | | PM |
| ZR | | ZR | |
| NL | ZR | | ZR |

| x2 \ x1 | NL | ZR | PL |
|---|---|---|---|
| PL | ZR | | ZR |
| ZR | | ZR | |
| NL | PM | | ZR |

| x2 \ x1 | NL | ZR | PL |
|---|---|---|---|
| PL | ZR | | ZR |
| ZR | | ZR | |
| NL | ZR | | PM |

| x2 \ x1 | NL | ZR | PL |
|---|---|---|---|
| PL | ZR | | ZR |
| ZR | | PM | |
| NL | ZR | | ZR |

FUZZY REASONING CIRCUIT
151
INPUT CIRCUIT
154
CHANGEOVER CIRCUIT
160
CONTROLLED OBJECT
150
DETECTOR
155
140
CONTROL APPARATUS
131
132
13n
SWITCH
161
162
16n
130
TARGET VALUE

FUZZY CONTROL APPARATUS IN WHICH RULES CAN BE CHANGED, METHOD OF OPERATING SAME, CONTROL SYSTEM IN WHICH CHANGEOVER IS CONTROLLED BY FUZZY REASONING, AND METHOD OF CONTROLLING THE SAME

This application is a division of application Ser. No. 07/793,443 filed Dec. 13, 1991, U.S. Pat. No. 5,515,476.

TECHNICAL FIELD

This invention relates to a fuzzy control apparatus, and to a method of operating the same, in which rules are capable of being changed during execution (operation) of fuzzy reasoning. The invention relates also to a system having a plurality of control apparatus for controlling one controlled object, especially a control system in which a changeover can be made among a plurality of control apparatus by fuzzy reasoning, and to a method of controlling this system.

BACKGROUND ART

A fuzzy control apparatus is provided with an input of a controlled variable from a controlled object, executes so-called modus ponens reasoning, and outputs a manipulated variable (a fuzzy-control output) to be applied to the controlled object. Fuzzy reasoning often is expressed by control rules ("If . . . , then . . . " rules) in an "If . . . , then . . . " format.

A fuzzy control apparatus is available in which the control rules can be changed by a manual or remote operation during execution (operation) of fuzzy reasoning. In a fuzzy control apparatus of this kind, there is the possibility that the fuzzy-control output will vary suddenly according to the content of a changed rule. When a fuzzy-control output undergoes a sudden change, there is the danger that the controlled object will be adversely affected.

In order to deal appropriately with a controlled object having a characteristic that differs depending upon state, and in order to raise the accuracy of control, a system which controls one controlled object by using a plurality of control apparatus has been proposed. In a control system of this kind, which control apparatus among the plurality thereof is to be given charge of controlling the controlled object is decided using an arithmetic expression that is expressed arithmetically, and a changeover is performed manually by an attendant.

However, in accordance with the arithmetic decision regarding the control apparatus to be put in charge and the changeover based upon this decision, it is difficult to arithmetically express, in accurate fashion, the timing at which the control apparatus is changed over, and to evaluate the timing. In addition, it is difficult to perform a highly accurate changeover.

Further, in a manual changeover performed by an attendant, a problem which arises is that reproducibility of changeover timing is poor and a variance develops in the results of control. For example, in a case where the operation of a moving object is controlled, a problem encountered is that smooth control of operation cannot be carried out. In addition, in a case where the manufacturing process of an article is controlled, a variance develops in the quality of the articles manufactured.

DISCLOSURE OF THE INVENTION

An object of the present invention is to provide a fuzzy control apparatus, and a method of operating the same, in which a fuzzy-control output can be varied smoothly even in a case where a rule is changed during operation.

Another object of the present invention is to provide a fuzzy control apparatus and a method of operating the same, in which a rule is capable of being changed only under a condition that a control output may not be suddenly varied.

Still another object of the present invention is to provide a control system and a control method in which the changeover among a plurality of control apparatus for controlling one controlled object can be performed appropriately at all times.

A fuzzy control apparatus in which a rule can be changed in accordance with the present invention is characterized by having fuzzy reasoning means in which a rule is capable of being changed during operation, means for storing a fuzzy reasoning output which prevails immediately prior to a rule change, synthesizing output means for combining, and outputting as a fuzzy-control output, the stored fuzzy reasoning output which prevailed immediately prior to the rule change and a fuzzy reasoning output which prevails following the rule change, and means for altering a combining ratio of the synthesizing output means in such a manner that, with passage of time from a moment at which the rule change is made, there is a gradual decrease in a percentage of the fuzzy reasoning output which prevailed immediately prior to the rule change, and a gradual increase in a percentage of the fuzzy reasoning output which prevails following the rule change, in the fuzzy-control output of the synthesizing output means, and for outputting, as the fuzzy-control output, and upon passage of a predetermined time from the moment at which the rule change is made, the fuzzy reasoning output which prevails following the rule change.

A method, in accordance with the present invention, of operating a fuzzy control apparatus which includes fuzzy reasoning means in which a rule is capable of being changed during operation, is characterized by storing a fuzzy reasoning output which prevails immediately prior to a rule change when a rule change is made, generating a fuzzy-control output by combining, after the rule change, the stored fuzzy reasoning output which prevailed immediately prior to the rule change and a fuzzy reasoning output which prevails following the rule change, altering a combining ratio in such a manner that, with passage of time from a moment at which the rule change is made, there is a gradual decrease in a percentage of the fuzzy reasoning output which prevailed immediately prior to the rule change, and a gradual increase in a percentage of the fuzzy reasoning output which prevails following the rule change, in the fuzzy-control output, and outputting, as the fuzzy-control output, and upon passage of a predetermined time from the moment at which the rule change is made, the fuzzy reasoning output which prevails following the rule change.

In accordance with the present invention, when a rule in the fuzzy control apparatus is changed, the fuzzy reasoning output prevailing just prior to the rule change and the fuzzy reasoning output prevailing following the rule change are combined. In the resulting combination, the percentage of the fuzzy reasoning output prevailing following the rule change gradually increases, while the percentage of the fuzzy reasoning output prevailing just prior to the rule change gradually decreases. As a result, the fuzzy-control output varies smoothly from the value immediately preceding the rule change to the value following the rule change, and therefore a sudden variation is avoided. Accordingly, the controlled object is not adversely affected.

Further, since the output of fuzzy reasoning is processed, the foregoing can be accomplished irrespective of the number of rules and the number of inputs. Accordingly, it is unnecessary to modify the construction of the fuzzy reasoning means and therefore the fuzzy control apparatus does not become more complicated in construction.

A fuzzy control apparatus in which a rule can be changed in accordance with the present invention is characterized by having fuzzy reasoning means in which a rule is capable of being changed during operation, rule holding means for holding a code which represents a new rule to be changed, means for determining whether degree of suitability of an input signal with respect to a membership function of an antecedent in the fuzzy reasoning means falls within allowable limits for a rule change, and control means for applying the code of the new rule held in the rule holding means to the fuzzy reasoning means when it is determined that the suitability of the input signal falls within the allowable limits, and for forbidding application of the code of the new rule to the fuzzy reasoning means when it is determined that the suitability of the input signal falls outside the allowable limits.

A method of operating a fuzzy control apparatus which includes fuzzy reasoning means in which a rule can be changed during operation in accordance with the present invention is characterized by holding a code, which represents a new rule to be changed, when the code has been applied, determining, when a rule-change command has been applied, whether degree of suitability of an input signal with respect to a membership function of an antecedent in the fuzzy reasoning means falls within allowable limits for a rule change, applying the held code of the new rule to the fuzzy reasoning means when it is determined that the suitability of the input signal falls within the allowable limits, and forbidding application of the code of the new rule to the fuzzy reasoning means when it is determined that the suitability of the input signal falls outside the allowable limits.

In accordance with the present invention, when a command for changing a rule in the fuzzy control apparatus is applied, it is determined whether the suitability of an input signal with respect to the membership function of an antecedent falls within allowable limits for a rule change. The rule change is carried out only if the suitability falls within the allowable limit, i.e., only when it is determined that the fuzzy reasoning output will not vary suddenly even if the rule change is made. As a consequence, the controlled object is prevented from being adversely affected by a sudden variation in the control output due to the rule change. If a new rule to be changed is set, it is determined automatically whether a sudden variation will not be produced in the fuzzy reasoning output even when the rule is changed. If this condition is satisfied, the rule change is executed. As a result, troublesome monitoring and checking are no longer necessary, and the time required for a rule change can be shortened.

A control system in which changeover is controlled by fuzzy reasoning in accordance with the present invention is characterized by having a plurality of mutually independent control apparatus having different roles from one another for controlling one controlled object, parameter deciding means for obtaining, by fuzzy reasoning, a parameter related to a combination ratio of outputs of the plurality of control apparatus, and synthesizing meters for producing a manipulated variable, which is to be applied to the controlled object, by combining the outputs of the plurality of control apparatus based upon the parameter decided by the parameter deciding means.

The above-mentioned parameter may be a weighting coefficient for combining the outputs of the plurality of control apparatus. Further, the parameter may be data for selecting any of the plurality of control apparatus. In this case, the synthesizing means delivers the output of the selected control apparatus as the manipulated variable.

A linear control apparatus such as a PID control apparatus, etc. or a non-linear control apparatus such as a fuzzy control apparatus may be used as above control apparatus. One or some of the plurality of control apparatus may be the PID control apparatus and the other may be the fuzzy control apparatus.

In a control system having a plurality of mutually independent control apparatus having different roles from one another for controlling one controlled object, a control method of a control system in which changeover is controlled by fuzzy reasoning in accordance with the present invention is characterized by deciding, by fuzzy reasoning, a parameter related to a combination ratio of outputs of the plurality of control apparatus, combining the outputs of the plurality of control apparatus based upon the parameter decided, and applying the combined value to the controlled object as a manipulated variable.

A control system in which changeover is controlled by fuzzy reasoning in accordance with the present invention is characterized by having a plurality of control apparatus for outputting manipulated-variable data independently of one another when data relating to a controlled object has been applied, and selecting means for deciding, by fuzzy reasoning, which control apparatus among the plurality thereof is to have the data relating to the controlled object applied thereto.

In accordance with the control system and control method of the present invention, one control apparatus from among the plurality thereof can be selected by fuzzy reasoning, and data outputted by the plurality of control apparatus can be appropriately combined and applied to the controlled object as a manipulated variable. As a result, a controlled object having a complex characteristic can be controlled smoothly and accurately. Since changeover and the decision of the combining ratio are made by fuzzy reasoning, it is unnecessary to use complicated numerical arithmetic expressions, and control can be performed by expressing an algorithm, which represents the know-how of an experienced technician, directly as a fuzzy rule. As a result, highly accurate control is possible through a simple arrangement.

BRIEF DESCRIPTION OF THE DRAWINGS

FIGS. 1 through 3 illustrate a first embodiment of a fuzzy control apparatus, in accordance with the present invention, in which a rule is capable of being changed, wherein:

FIG. 1 is a block diagram illustrating the electrical construction of the fuzzy control apparatus;

FIG. 2 is a timing chart illustrating the operation of each circuit in FIG. 1; and FIG. 3 is a flowchart, which illustrates an embodiment wherein the present invention is realized by software, showing the processing procedure of operation control of the fuzzy control apparatus;

FIGS. 4 through 10 illustrate a second embodiment of a fuzzy control apparatus, in accordance with the present invention, in which a rule is capable of being changed, wherein:

FIG. 4 is a block diagram illustrating the electrical construction of the fuzzy control apparatus;

FIG. 5 is a circuit diagram illustrating some of the circuits contained in an inference unit, shown in FIG. 4, as well as the mutual relationship among these circuits;

FIG. 6 is a circuit diagram showing the concrete construction of a membership-function circuit;

FIG. 7 is a graph showing input/output characteristics of the membership-function circuit;

FIG. 8 is a circuit diagram showing a fuzzy membership-function generating circuit realized using a switch matrix;

FIG. 9 illustrates the concrete construction of a symbol in FIG. 8; and

FIG. 10 is a flowchart, which illustrates an embodiment wherein the present invention is realized by software, showing the processing procedure of operation control of the fuzzy control apparatus;

FIGS. 11 through 16 illustrate an embodiment of a control system, in accordance with the present invention, in which changeover is controlled by fuzzy reasoning, in which:

FIG. 11 is a block diagram illustrating the overall construction of the control system;

FIG. 12 is a graph showing an example of a membership function of input data;

FIG. 13 is a graph showing an example of the membership function of a coefficient;

FIGS. 14*a* through 14*e* show examples of rules;

FIG. 15 is a diagram in which the roles of a plurality of control apparatus are represented in a rectangular coordinate system; and FIG. 16 is a block diagram showing another embodiment.

BEST MODE FOR CARRYING OUT THE INVENTION

First Embodiment

Figure 1:
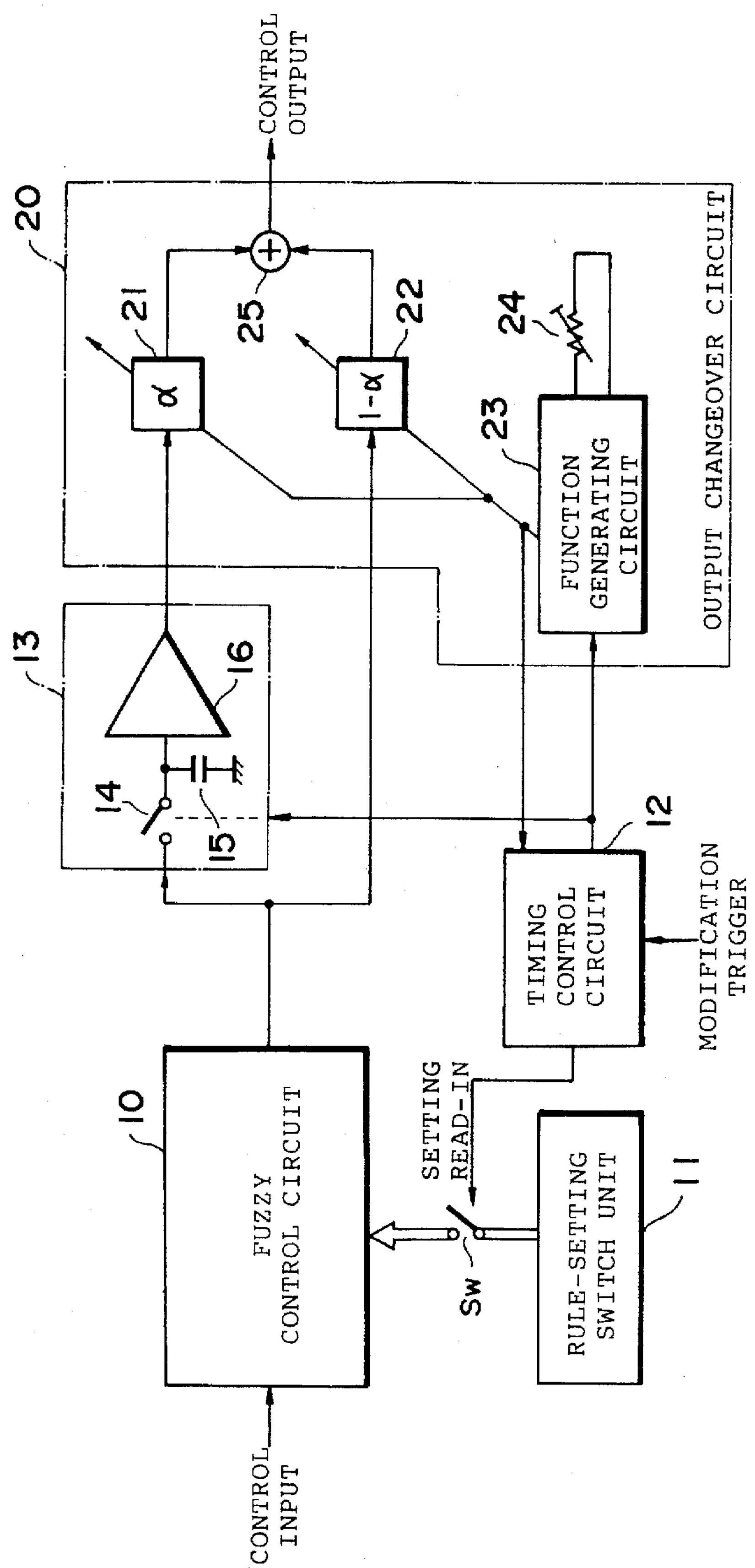
Figure 2:
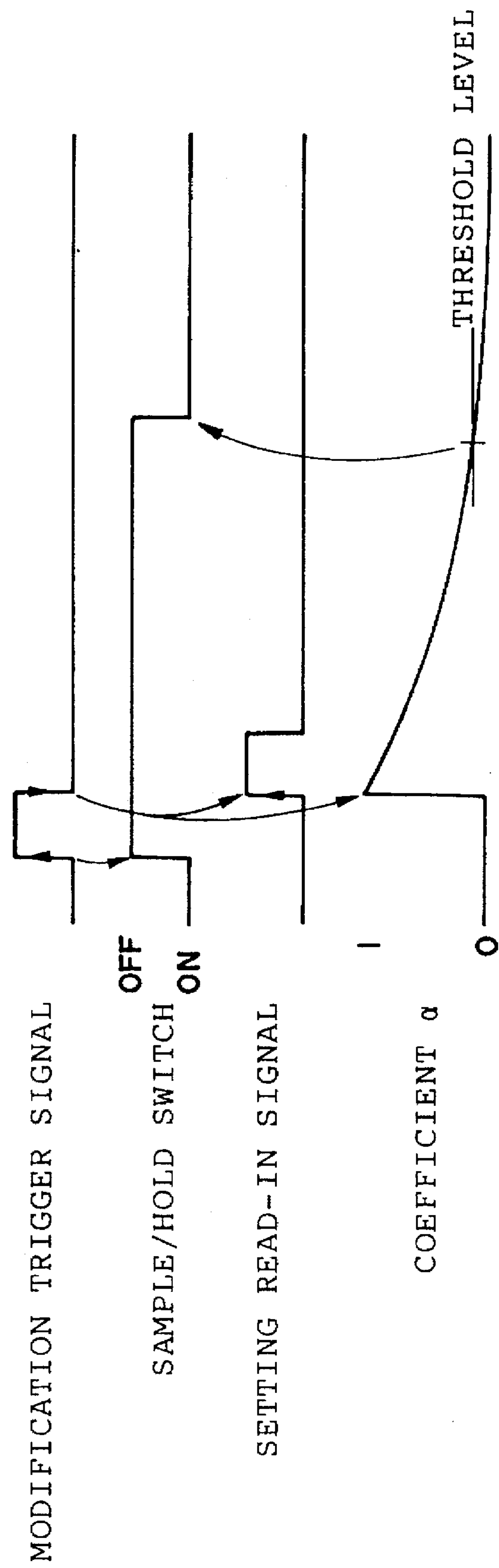

FIG. 1, which illustrates an embodiment of a fuzzy control apparatus, in accordance with the present invention, in which a rule is capable of being changed, is a block diagram showing the electrical construction of the fuzzy control apparatus. FIG. 2 is a timing chart for describing the operation of each circuit in FIG. 1.

A fuzzy control circuit 10, which is referred to also as a fuzzy controller or fuzzy reasoning unit, etc., executes fuzzy reasoning in accordance with a predetermined rule ("If . . . , then . . . " rule). The fuzzy control circuit 10 includes not only special-purpose devices (either of analog or digital type) for fuzzy reasoning (for example, see "Nikkei Electronics", Jul. 27, 1987, pp. 148–152, published by Nikkei McGraw-Hill), but also binary-type computers and processors programmed so as to execute fuzzy reasoning.

The fuzzy control circuit 10 performs fuzzy reasoning, in accordance with a set rule, in dependence upon a given control input (a controlled variable or an offset between a target value and a controlled variable), and generates a fuzzy reasoning output which is the result of this reasoning. The fuzzy reasoning output is applied to a sample/hold circuit 13 and to a coefficient unit (or amplifier circuit) 22 of an output changeover circuit 20, described below.

The sample/hold circuit 13 comprises a switch circuit 14, a capacitor 15 and a buffer amplifier 16. The input terminal of the buffer amplifier 16 is connected to the output terminal of the fuzzy control circuit 10 via a switch circuit 14, and to the capacitor 15, one end of which is grounded. The switch circuit 14 is on/off controlled by a control signal provided by a timing control circuit 12, described later. The output of the sample/hold circuit 13 is applied to a coefficient unit (or amplifier circuit) 21 of the output changeover circuit 20.

A control rule for fuzzy reasoning in the fuzzy control circuit 10 is set by a rule-setting switch unit 11. The rule set by the rule-setting switch unit 11 is read in the fuzzy control circuit 10 when a switch Sw is turned on. Changing the control rule also is possible as by switch changeover within the rule-setting switch unit 11. The switch Sw is turned on by a setting read-in signal outputted by the timing control circuit 12.

The output changeover circuit 20 comprises a function generating circuit 23, the aforementioned coefficient units 21, 22, and an adder 25 which adds the outputs of the coefficient units 21, 22. The function generating circuit 23 outputs a function signal which rises sharply in synchronism with a trigger signal provided by the timing control circuit 12, and which then gradually diminishes in level with the passage of time (e.g., a signal which declines linearly, exponentially or in a step-like manner). The function signal outputted by the function generating circuit 23 is applied to the coefficient units 21 and 22, whose coefficients (or gains) $\alpha$ and $1-\alpha$ are changed by the function signal, and also applied to the timing control circuit 12. The coefficient $\alpha$ takes on values range from 1 to 0 and varies in the same manner as the above-mentioned function signal. The function generating circuit 23 is provided with a variable resistor 24 for adjusting the time constant of the outputted function signal. As a result, the rate of the decrease in the function value with respect to elapsed time can be determined in suitable fashion. The output of the adder 25 is the control output (manipulated variable) applied to the controlled object.

When the control rule is changed during the operation of the fuzzy control circuit 10, the operator changes over the switch in the rule-setting switch unit 11 in such a manner that the desired rule is set. A modification trigger signal is applied to the timing control circuit 12 at the moment the rule is to be changed.

The timing control circuit 12 applies a control signal to the switch circuit 14 of the sample/hold circuit 13 in synchronism with the leading edge of the modification trigger signal. As a result, the switch circuit 14 is turned off. Accordingly, the fuzzy reasoning output (voltage) of the fuzzy control circuit 10 prevailing just prior to turn-off of the switch circuit 14 (i.e., just prior to the rule change) is held in the capacitor 15.

Next, the setting read-in signal is applied to the switch Sw in synchronism with the trailing edge of the modification trigger signal. As a result, the switch Sw is turned on temporarily and the new rule set in the rule-setting switch unit 11 is accepted by the fuzzy control circuit 10. From this point onward, the fuzzy control circuit 10 executes fuzzy reasoning in accordance with the newly set rule.

Further, the timing control circuit 12 applies a trigger signal to the function generating circuit 23 at the trailing edge of the modification trigger signal. The circuit 23 generates the function signal, which rises instantaneously (at which time the coefficient $\alpha$ becomes 1) and then gradually decays.

The fuzzy-control output which prevailed just prior to the rule change, and which is being held in the sample/hold circuit 13, is applied to the coefficient unit 21. The fuzzy reasoning output (the output following the rule change) of the fuzzy control circuit 10 is applied to the coefficient unit 22. The coefficient unit 21 delivers the fuzzy reasoning output, which prevailed just prior to the rule change, upon multiplying it by the coefficient $\alpha$. The coefficient unit 22 delivers the fuzzy reasoning output, which prevails following the rule change, upon multiplying it by the coefficient $(1-\alpha)$. The outputs of the coefficient units 21 and 22 are applied to the adder 25, which adds these outputs and delivers thee sum as the fuzzy-control output.

The coefficient $\alpha$ decreases monotonously with the passage of time, as shown in FIG. 2. Consequently, when a rule is changed, the percentage of the control output from the output changeover circuit 20 that is occupied by the fuzzy reasoning output prevailing just prior to the rule change gradually diminishes with the passage of time, while the percentage of the control output that is occupied by the fuzzy reasoning output following the rule change gradually increases with the passage of time. Accordingly, the control output does not vary suddenly with a change in the rule but instead varies smoothly from the value just prior to the rule change to the value following the rule change.

When the function signal (coefficient $\alpha$) falls below a predetermined threshold level at elapse of a fixed time from the moment of the rule change, the control signal which the timing control circuit 12 is applying to the switch circuit 14 of the sample/hold circuit 13 is terminated, and therefore the switch 14 is turned on. As a result, the fuzzy reasoning output of the fuzzy control circuit 10 is applied to the sample/hold circuit 13 at all times. Further, since the coefficient $\alpha$ becomes zero or almost zero, the fuzzy reasoning output of the fuzzy control circuit 10 which prevails following the rule change is delivered as the fuzzy-control output through the coefficient unit 22 and adder 25.

Figure 3:
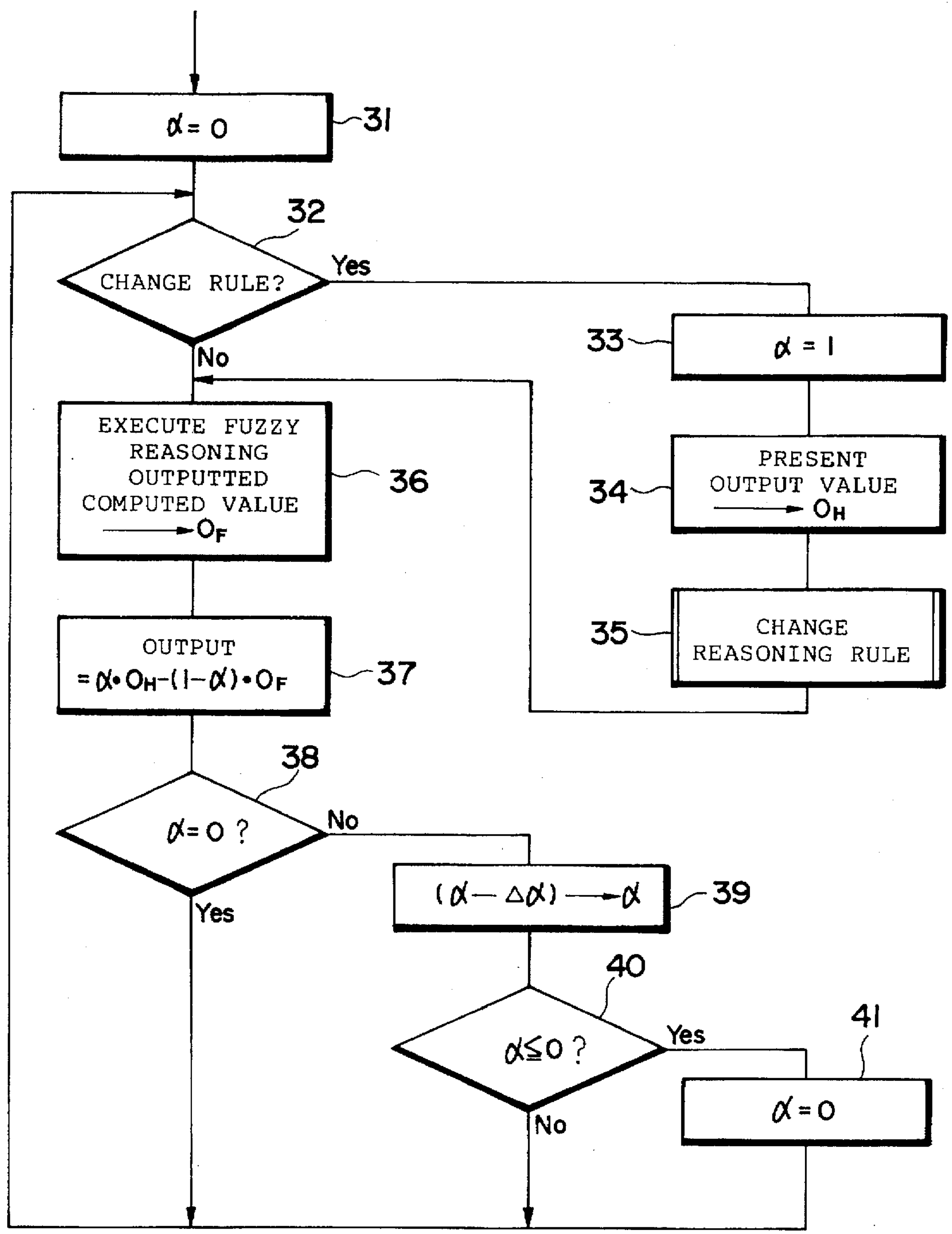

FIG. 3 is a flowchart illustrating an example of the procedure of the operation of the fuzzy control apparatus in a case where the present invention is realized by software in a computer system. In this case, the fuzzy reasoning also is realized by the software of the computer system.

First, a parameter $\alpha$, which decides the combining ratio (the percentage or weighting for adding of the fuzzy reasoning output just prior to the rule change to the fuzzy reasoning output following the rule change, is cleared (step 31). Next, it is determined (step 32) whether the rule of fuzzy reasoning is to be changed (i.e., whether there is an input of a rule-change command). When the rule is to be changed (YES at step 32), the parameter $\alpha$ is set at 1 and a fuzzy reasoning value $O_H$ prevailing just prior to the rule change is stored (steps 33, 34). The rule is then changed (step 35).

In a case where there is no rule-change command (inclusive also of a case where a rule change has already been made) (NO at step 32), fuzzy reasoning is carried out in dependence upon the input value, and this reasoning value $O_F$ is stored (step 36). Next, the value of the fuzzy-control output is calculated in accordance with the equation $\alpha \cdot O_H + (1-\alpha) \cdot O_F$ using the parameter $\alpha$, the stored reasoning value $O_H$ prevailing just prior to the rule change, and the current reasoning value $O_F$, and the calculated value is delivered as the control output (step 37).

Next, it is determined whether the parameter $\alpha$ is 0 (step 38). If the parameter $\alpha$ is not 0 (NO at step 38), then a minute quantity $\Delta\alpha (0<\Delta\alpha<1)$ is subtracted from the current parameter $\alpha$ and the result of the subtraction operation is set as a new parameter $\alpha$ (step 39). It is then determined whether the new parameter $\alpha$ is negative (step 40). If the parameter $\alpha$ is positive (NO at step 40), the program returns to step 32 and the processing of steps 36–39 is repeated. As a result, the parameter $\alpha$ gradually decreases with the passage of time. Therefore, in the fuzzy-control output, there is a decrease in the percentage of the fuzzy reasoning output prevailing just prior to the rule change and an increase in the percentage of the fuzzy reasoning output which follows the rule change.

When the new parameter $\alpha$ becomes negative, $\alpha$ is forcibly set to 0 (step 41).

In a case where the parameter $\alpha$ is 0 (YES at step 38), processing for updating the parameter $\alpha$ is not carried out and the program returns to step 32 so that the processing of steps 36, 37 is repeated. In this case, the fuzzy reasoning value $O_F$ prevailing after the rule change becomes the fuzzy-control output, which is delivered.

In accordance with the processing procedure of the flowchart shown in FIG. 3, the parameter $\alpha$ gradually decreases incrementally at the fixed value $\Delta\alpha$. However, this does impose a limitation upon the invention, for it will suffice if the parameter decreases monotonously. Accordingly, it goes without saying that an arrangement may be adopted in which the parameter $\alpha$ gradually decreases exponentially, by way of example.

Second Embodiment

Another embodiment of a fuzzy control apparatus in which a rule is capable of being changed according to the present invention will now be described. This embodiment relates to a fuzzy controller of the type in which a membership function is expressed by a voltage distribution which appears on a plurality of signal lines. Here the invention is applied to an arrangement which performs fuzzy reasoning by a MIN/MAX operation.

Figure 4:
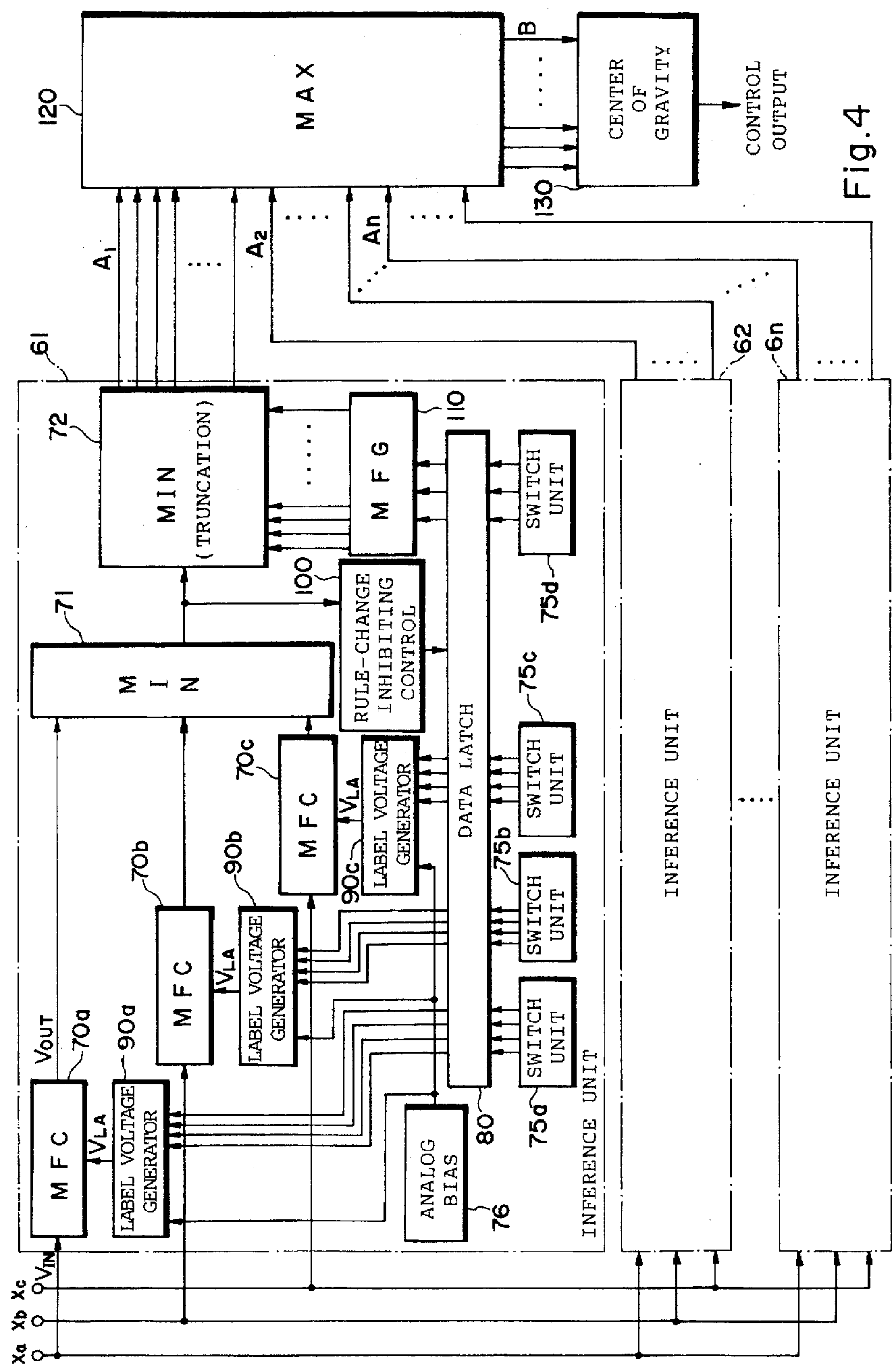

FIG. 4 is a block diagram illustrating the fuzzy control apparatus of this embodiment.

N-number of inference units 61–**6*n*, which correspond to the number of set control rules, are provided. Each inference unit 6*i* (i=1–n) is equipped with membership function circuits (hereinafter referred to as MFCs) 70*a*, 70*b*, 70*c*, the number of which (three in this embodiment) is equal to the number of types of input variables $x_a$, $x_b$, $x_c$. These MFCs 70*a*–70*c*, which represent fuzzy sets described by the antecedent in a control rule, output membership-function values (degrees of suitability) with regard to the input variables. The outputs of the MFCs 70*a*–70*c* enter a MIN circuit 71**, which subjects these signals to a MIN operation.

A circuit (hereinafter referred to as an MFG) 110, which generates a membership function representing a fuzzy set described by the consequent in a control rule, is provided. The MFG 110 outputs a membership function represented by voltages distributed on a plurality (m; for example, 25) outputs lines. The membership function is applied to a MIN circuit (a truncation circuit) 72. The MIN circuit 72 executes a MIN operation between each output value representing the membership function provided by the MFG 110, and the result of the MIN operation outputted by the MIN circuit 71, and outputs a membership function, which represents the results of reasoning, in the form of voltage signals distributed on the m-number of lines (output $A_i$: i=1–n).

The results of reasoning A1–An outputted by the inference units 61–**6*n* are applied to a MAX circuit 120. After these results are subjected to a MAX operation, final results of reasoning B are obtained as voltage signals similarly distributed on m-number of lines. A center-of-gravity circuit 130** is provided in order to obtain a definite output (a non-fuzzy output) from the results of reasoning B.

In each inference unit **6*i*, the membership functions in the MFCs 70*a*–70*c* and MFG 110 are set to predetermined shapes and at predetermined positions in dependence upon the control rule. The shape and position of a membership function are capable of being changed. The rule change is realized by changing either the shape or position of a membership function, or both. The positions of the membership functions of the MFCs 70*a*–70*c* are decided by a label voltage $V_{LA}$, which is outputted by each of label-voltage generating circuits 90*a*, 90*b*, 90*c***.

It is possible to change a control rule even during execution of fuzzy reasoning. The three membership functions of the antecedent are set or changed by setting in setting digital switch units 75*a*, 75*b*, 75*c* codes (referred to as labels) of membership functions to be set (or of new membership functions to be changed). These rule codes are latched in a latch circuit 80 at a timing allowed by a rule-change inhibiting control circuit 100, whence they are applied to corresponding label-voltage Generating circuit 90*a*, 90*b*, 90*c*, respectively. The setting of the code of the membership function of the consequent is carried out using a digital switch unit 75*d*. Under the control of the control circuit 100, the code set in the digital switch unit 75*d* is applied to the MFG 110 after being similarly latched in the latch circuit 80, and the change in the consequent membership function for changing the control rule is carried out.

Figure 5:
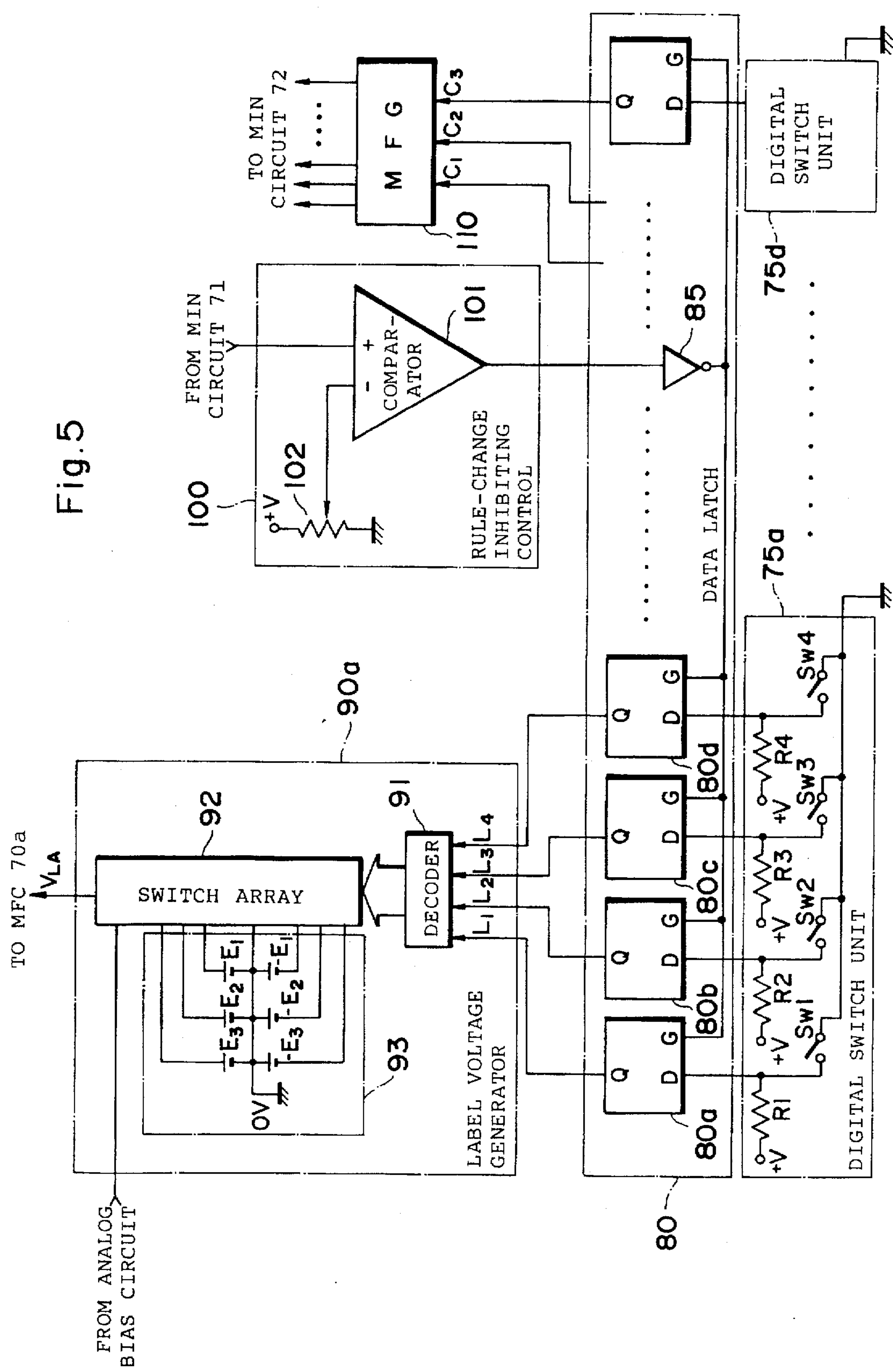

FIG. 5 illustrates a concrete example of the arrangement of, as well as the relationship among, the digital switch unit 75*a*, the data latch circuit 80, the label-voltage generating circuit 90*a*, the rule-change inhibiting control circuit 100, and the MFG 110.

The code of an antecedent membership function is represented by four bits, and therefore the digital switch unit 75*a* includes four switches Sw1–Sw4. The same is true for the other digital switch units 75*b*, 75*c*. One ends of the switches Sw1–Sw4 are connected together and grounded. The other ends of the switches Sw1–Sw4 are connected to D-input terminals of respective D-type flip-flops 80*a*–80*d* contained in the data latch circuit 80. The other ends of the switches Sw1–Sw4 are further connected to positive voltage terminals via pull-up resistors R1–R4, respectively. As a result, in conformity with the on/off states of the switches Sw1–Sw4, L-, H-level input signals are applied to the D-input terminals of the D-type flip-flops 80*a*–80*d*.

The inference unit 61 includes the rule-change inhibiting control circuit 100. The rule-change inhibiting control circuit 100 applies a new rule, which has been set in the digital switch unit 75*a*, etc. during execution of fuzzy reasoning, to the MFCs 70*a*–70*c* and MFG 110, etc., under conditions in which a sudden fluctuation will not be produced in the control output, and forbids a change in the rule of the MFCs and MFG in a case where the control output will experience a sudden fluctuation.

The rule-change inhibiting control circuit 100 is constituted by a comparator 101 and a reference-voltage circuit 102. A voltage representing the result of the MIN operation outputted by the MIN circuit 71 is applied to a positive input terminal of the comparator 101, and a reference voltage outputted by the reference-voltage circuit 102 enters a negative input terminal of the comparator. The output of the comparator 101 is applied to a timing input terminal G of each of the D-type flip-flops 80*a*–80*d* via an inverter 85. When the result of the MIN operation outputted by the MIN circuit 71 is higher than the reference voltage, the rule change by the digital switch unit 75*a*, etc., causes the fuzzy-control output to vary in a sudden manner. Therefore, in order to prevent this, the H-level output signal of the comparator 101 is applied as an L-level signal to each G input terminal of the D-type flip-flops 80*a*–80*d* via the inverter 85. Accordingly, the flip-flops 80*a*–80*d* will not operate. In a case where the result of the MIN operation outputted by the MIN circuit 71 is lower than the reference voltage, it is judged that the rule change by the digital switch unit 75*a*, etc., will not cause a sudden variation in the fuzzy-control output. At such time, the output of the comparator 101 is the L level, and therefore an H-level timing signal is applied to the flip-flops 80*a*–80*d*. The flip-flops 80*a*–80*d* latch the code set in the digital switch unit 75*a* and apply the code $L_1$–$L_4$ to the label-voltage generating circuit 90*a*.

The rule codes set in the other digital switch units 75*b*, 75*c* also are similarly applied to the corresponding label-voltage generating circuits 90*b*, 90*c*, respectively, through the latch circuit 80 only in a case where the rule change is allowed by the control circuit 100.

The membership function of the consequent is represented by a code of three bits, and therefore the digital switch unit 75*d* includes three switches. The code that has been set in the digital switch unit 75*d* also is inputted to the MFG 110 as codes $C_1$, $C_2$, $C_3$ through the latch circuit 80 only in a case where the rule change is allowed by the control circuit 100.

The label-voltage generating circuit 90*a* is constructed by a decoder 91, a switch array 92 and a reference-voltage generating circuit 93. A selecting circuit is constructed by the decoder 91 and the switch array 92.

The reference-voltage generating circuit 93 generates seven types of predetermined label voltages (reference voltages) $-E_3$ through $E_3$ and outputs these voltages on respective ones of seven different lines. These label voltages enter the switch array 92.

The output voltage of an analog biasing circuit (an arbitrary-voltage generating circuit) 76 which outputs an arbitrary voltage (though a voltage between $-E_3$ and $E_3$) also enters the switch. array 92.

The four-bit digital code $L_3$, $L_2$, $L_1$, $L_0$ is applied to the decoder 91, as mentioned above. The decoder 91 decodes the code and controls the switch array 92. Specifically, among the eight types of input voltages inclusive of the output voltage of the analog biasing circuit 76 inputted to the switch array 92, that designated by the digital code $L_3$–$L_0$ is outputted from the switch array 92 as the label voltage $V_{LA}$. The label voltage $V_{LA}$ is supplied to the MFC 70*a*.

Figure 6:
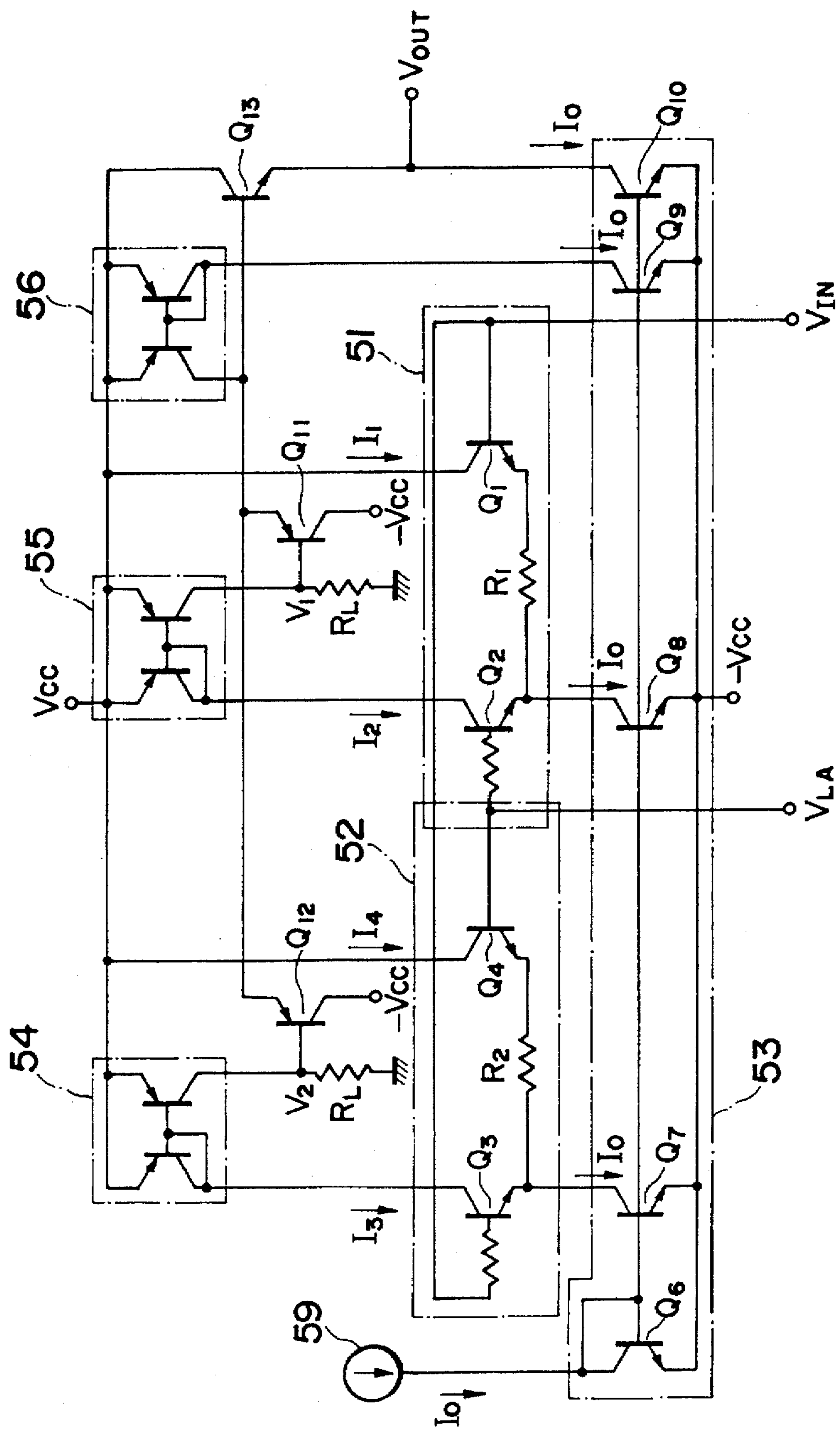

Basically, in accordance with a triangular membership function having a peak at the position of the applied label voltage $V_{LA}$, the MFC 70*a* generates an output voltage $V_{OUT}$ representing the corresponding membership-function value when an input voltage (a voltage representing an input variable) $V_{IN}$ is applied. A concrete example of the construction of this MFC 70*a* is illustrated in FIG. 6. The other MFCs 70*b* and 70*c* are similarly constructed.

The MFC 70*a* includes a current source 59 of a current $I_0$ and a multiple-output current mirror 53 driven by this current source 59. The multiple-output current mirror 53 includes transistors $Q_6$, $Q_7$, $Q_8$, $Q_9$ and $Q_{10}$. Accordingly, a current $I_0$ equal to the current of the current source 59 flows into the transistors $Q_7$, $Q_8$, $Q_9$ and $Q_{10}$ so that these transistors $Q_7$–$Q_{10}$ act as current sources.

The MFC 70*a* includes two differential circuits 51 and 52. The differential circuit 51 will be described first.

The differential circuit 51 includes two transistors $Q_1$ and $Q_2$ between the emitters of which a resistor $R_1$ is connected. An input voltage $V_{IN}$, namely the input variable $x_a$, is applied to the base of the one transistor $Q_1$, and the label voltage $V_{LA}$ is applied to the base of the other transistor $Q_2$. The current $I_0$ is supplied to the emitters of both transistors $Q_1$, $Q_2$ by the transistor $Q_8$ serving as the current source.

Let $I_1$ represent the current which flows into the transistor $Q_1$ and $I_2$ the current which flows into the transistor $Q_2$. When $V_{IN}<V_{LA}$ holds, a current $I_2=I_0$ flows into the transistor $Q_2$ and no current ($I_1=0$) flows into the transistor $Q_2$. When the input voltage $V_{IN}$ exceeds the label voltage $V_{LA}$, the current $I_2$ of transistor $Q_2$ diminishes linearly with an increase in the input voltage $V_{IN}$, and the current $I_1$ which flows into the transistor $Q_1$ increases linearly from zero. When the relation $V_{IN}=V_{LA}+R_1I_0$ is attained, the relations $I_2=0$, $I_1=I_0$ are established. This state is maintained in a region of $V_{IN}$ greater than the foregoing.

A current mirror 55 is provided and is driven by the current $I_2$ which flows into the transistor $Q_2$. A resistor $R_L$ is connected to the output side of the current mirror 55. Let the voltage developed across the resistor $R_L$ be a voltage $V_1$. Since the voltage $V_1$ is given by $V_1=I_2R_L$, it is constant up to a prescribed input voltage with respect to an increase in the input voltage $V_{IN}$ and then changes so as to attain the zero level after decreasing in linear fashion. The slope of the portion at which the voltage $V_1$ decreases linearly is given by $-R_L/R_1$. This slope can be changed by changing the value of the resistor $R_1$.

The other differential circuit 52 has the same construction as that of the differential circuit 51. Let $R_2$ represent the resistor connected between the emitters of two transistors $Q_3$ and $Q_4$, and let $I_3$, $I_4$ represent the currents which flow into the transistors $Q_3$, $Q_4$. The differential circuit 52 is driven by the transistor $Q_7$ serving as a current source. A current mirror 54 is driven by the current $I_3$ which flows into the transistor $Q_3$. Since the current $I_3$ flows into the resistor $R_L$ connected to the output side of the current mirror 54, a voltage $V_2$ dropped across the resistor $R_L$ is represented by $V_2=I_3R_L$. With regard to a change in the input voltage $V_{IN}$, the voltage $V_2$ is at the zero level up to a prescribed input voltage, then increases linearly and attains a constant level. The slope of the portion at which the voltage $V_2$ increases linearly is given by $R_L/R_2$.

The MFC 70*a* is further provided with a two-input MIN circuit. The two-input MIN circuit outputs whichever of its two input voltages is lower.

The two-input MIN circuit comprises a comparator and a compensator. The comparator is constituted by transistors $Q_{11}$, $Q_{12}$ whose emitters are connected together, and a current mirror 56 which acts as a current source for driving these transistors. The current mirror 56 is driven by the transistor $Q_9$. Since the aforesaid voltages $V_1$ and $V_2$ are applied to the bases of the transistors $Q_{11}$ and $Q_{12}$, respectively, the transistor having the smaller voltage (here represented by $V_{min}$) of these voltages $V_1$ and $V_2$ applied to its base is rendered conductive, and the other transistor is cut off. Accordingly, a voltage $(V_{min}+V_{EB})$, which is obtained by adding the emitter/base voltage $V_{EB}$ of the conductive transistor to the voltage $V_{min}$, appears at the emitters. This voltage is applied to the base of a transistor $Q_{13}$.

The compensator, which is constituted by the transistor $Q_{13}$ and the transistor $Q_{10}$ that is for current-driving this transistor, compensates the voltage $V_{BE}$ that appears as a computation error at the output of the comparator. As a result of reducing the voltage $V_{EB}$ at the transistor $Q_{13}$, $V_{min}$ appears as the output voltage $V_{OUT}$ at the emitter thereof. This output voltage is shown in FIG. 7.

Figure 7:
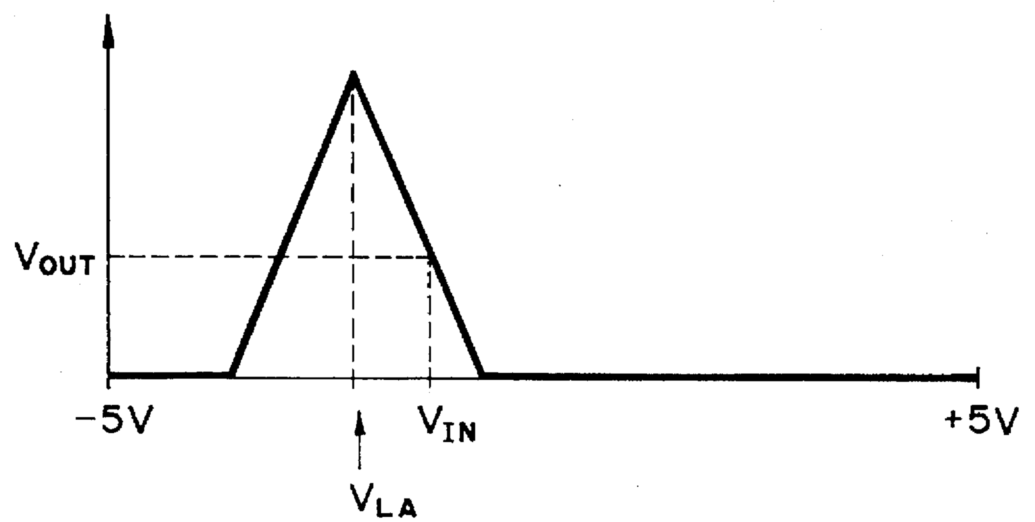

Thus, a membership function whose peak position is the label voltage $V_{LA}$ is set in the MFC 70*a*, and an output voltage $V_{OUT}$, which represents the membership-function value conforming to the input $V_{IN}$, is obtained, as shown in FIG. 7.

Figure 9:
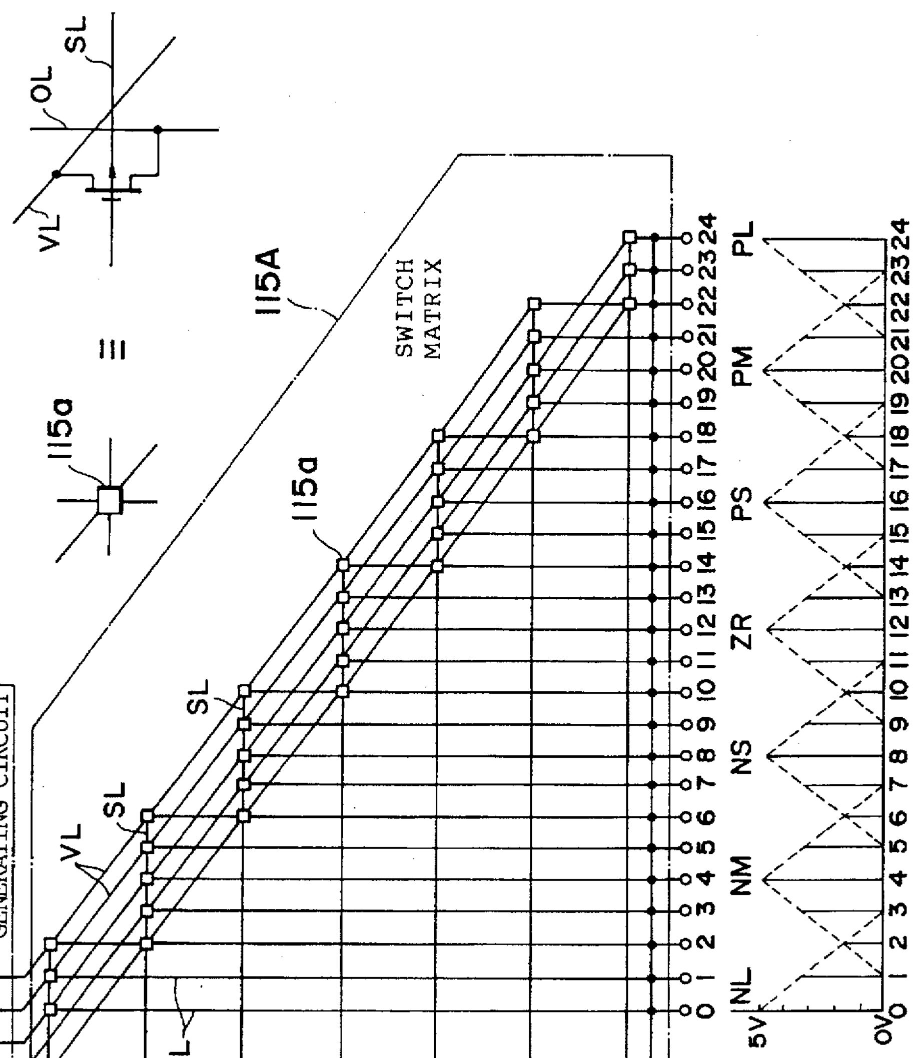
Figure 8:
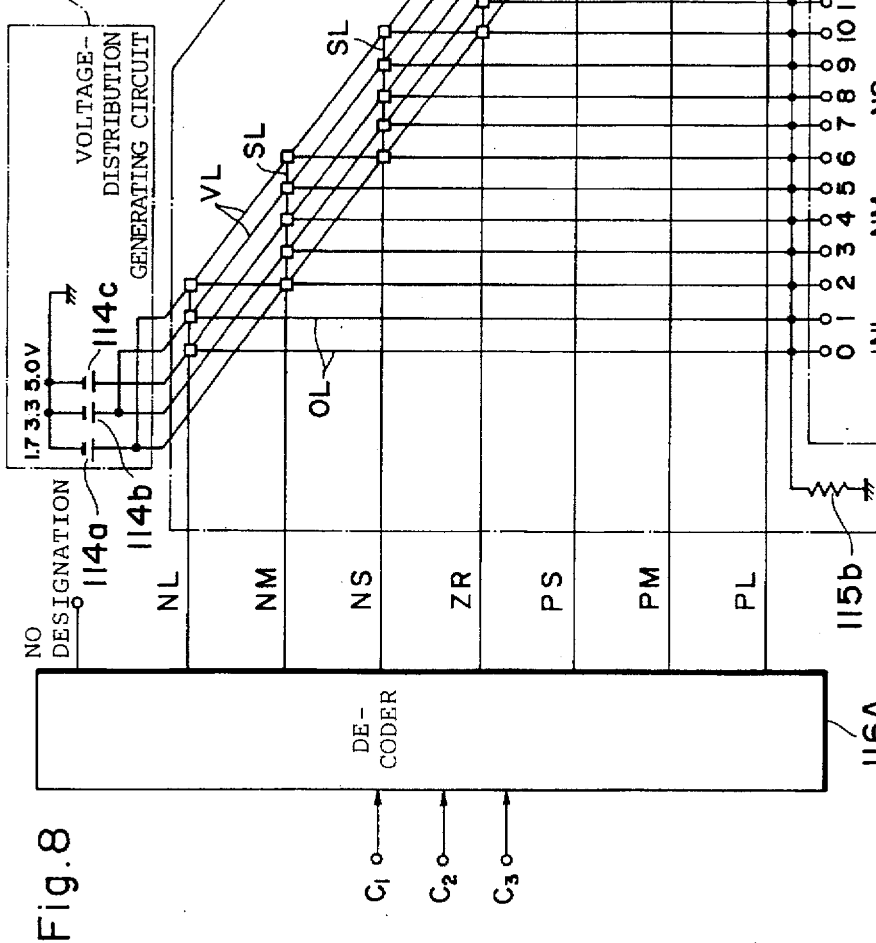

FIGS. 8 and 9 illustrate an example of the membership-function generating circuit (MFG) 110 using a switch matrix as the switch array. In FIG. 8, seven types of membership functions, which are outputted from 25 output terminals, numbered 0 through 24, of the membership-function generating circuit, are illustrated below these output terminals.

The values of these outputted membership functions are quantified to four levels for the sake of simplification. These four levels correspond to voltages 0, 1.7, 3.3 and 5.0, respectively. The four levels are stipulated by a voltage-distribution generating circuit 114A. The circuit 114A is provided with three fuzzy truth-value voltage sources 114*a*, 114*b* and 114*c* of voltages 1.7, 3.3 and 5.0 V. Five voltage lines VL drawn diagonally in FIG. 8 are led out from the circuit 114A. The central line is connected to the voltage source 114*c*, the lines on either side of the central line are connected to the voltage source 114*b*, and the two outermost lines are connected to the voltage source 114*a*.

A decoder 116A is a 1-of-8 decoder. The three-bit ($C_1$, $C_2$, $C_3$) binary signal representing a label provided by the data latch circuit 80 enters the decoder 116A. The decoder 116A outputs an H-level signal at any of its eight output terminals in conformity with the code represented by this input signal. The eight output terminals correspond to no designation and to seven types of babels. For example, an H-level signal is outputted at the no-designation output terminal when the input code signal is 000, and at an NL output terminal when the input code signal is 001. Signal lines SL indicated by the horizontal lines in FIG. 8 are led out from these output terminals, with the exception of the no-designation output terminal.

In a switch matrix 115A, output lines OL are led out to the 25 output terminals from prescribed points of intersection between the voltage lines VL and the signal lines SL. A symbol 115*a*, which is indicated by a small square at each of these points of intersection, is a switch provided between the voltage line VL and output line OL and on/off-controlled by the voltage on the signal line SL. By way of example, the switch is constructed by a MOS FET. It is of course permissible to provide two or more of the switches 115*a* on one output line OL. All the output lines are grounded via a register 115*b* at their output terminal sides.

When the three-bit binary signal ($C_1$, $C_2$, $C_3$) representing the label from the data latch circuit 80 is applied to the decoder 116A in the above-described arrangement, an H-level signal appears at whichever of the signal lines SL corresponds to this label, and the switches 115*a* provided on this signal line are turned on. As a result, each voltage of the voltage-distribution generating circuit 114A appears at the corresponding output terminal via the output lines OL through the switches 115*a* that have been turned on, and therefore a voltage distribution representing the membership function is outputted.

In the above-described embodiment, the rule change is carried out in accordance with the setting by the digital switch units 75*a*–75*d*. However, it goes without saying that the present invention is applicable also to a fuzzy control apparatus in which the rule change can be performed not only by a manual operation but also by remote control. Further, the invention can be applied also to a fuzzy control apparatus realized by a binary computer.

Figure 10:
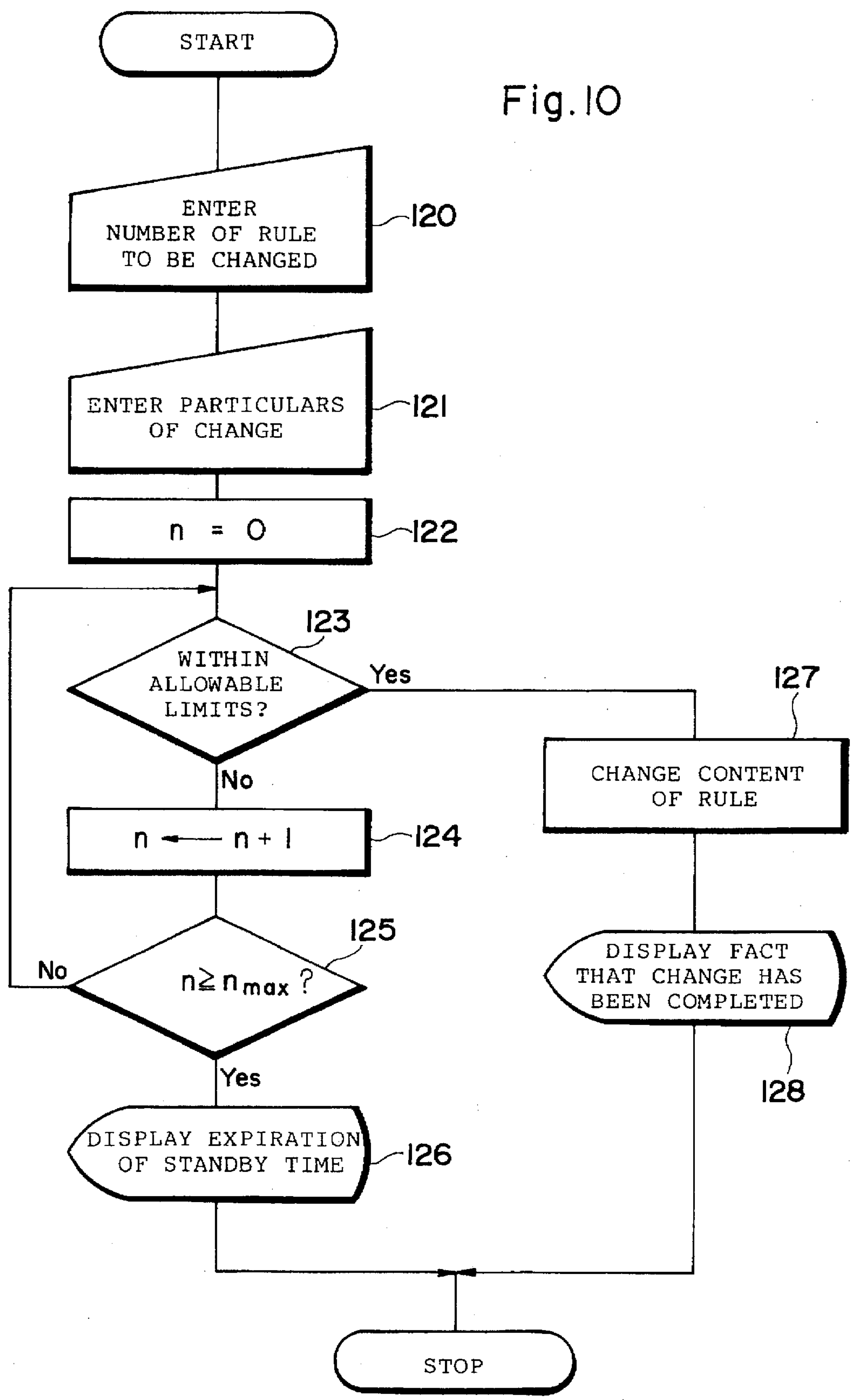

FIG. 10 is a flowchart illustrating an example of a procedure of the operation of a fuzzy control apparatus in a case where the present invention is realized by software in a computer system. In this case, fuzzy reasoning also is realized by the software of a computer system.

First, the number of rule to be changed is inputted by the operator (step 120). The particulars of the rule change are inputted from rule-change input means (a keyboard or the like) (step 121). Thereafter, a counter is cleared (step 122). When the result of the MIN operation of an antecedent is outside allowable limits, the counter measures suspension standby time for temporarily suspending the rule change in order to prevent a sudden variation in the control output. When the counter is cleared, it is determined whether the value of the MIN operation indicative of the degree of suitability of the antecedent membership function is within the allowable limits (step 123).

If the value is not within the allowable limits (NO at step 123), the counter is incremented and it is determined whether the suspension standby time has arrived (steps 124, 125). The processing of steps 123 through 125 continues up to attainment of the standby time so long as a NO answer is obtained at step 123. When the standby time elapses, a display to this effect is presented (step 126).

If the result of the MIN operation is within the allowable limits (YES at step 123), then the control output will not change suddenly owing to a rule change. Accordingly, the contents of the rule are changed and a display to the effect that the change has been completed is presented (steps 127, 128).

Third Embodiment

An embodiment of a control system in which changeover is controlled by fuzzy reasoning in accordance with the present invention will now be described.

Figure 11:
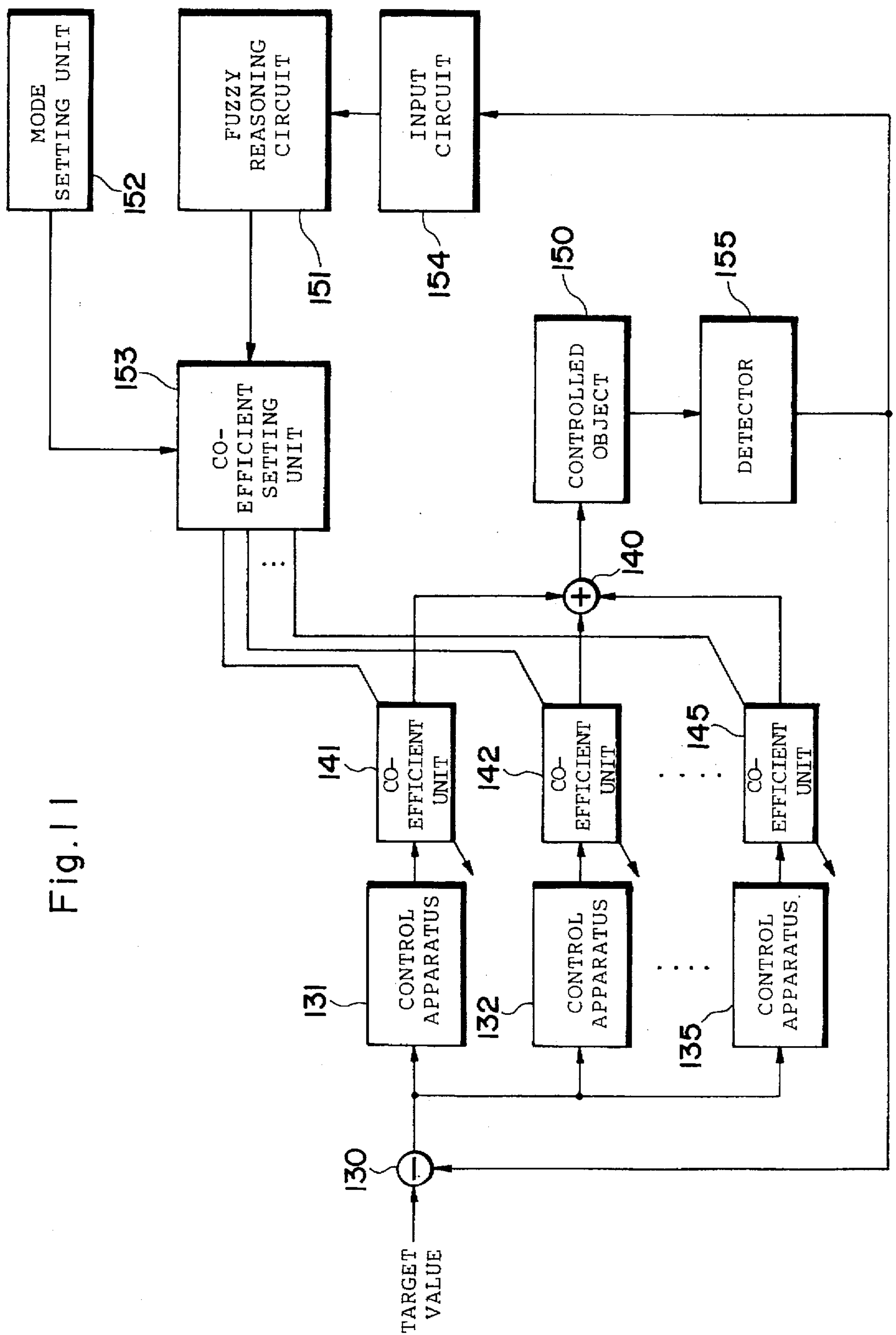

FIG. 11 illustrates the overall construction of a control system in which one controlled object is controlled using a plurality of control apparatus. In this embodiment, five control apparatus 131, 132, . . . , 135 are provided in order to control a controlled object 150. Though two of the control apparatus are not illustrated, reference numerals 133, 134 are assigned thereto as necessary.

The control apparatus 131–135 perform feedback control. A controlled variable detected at the controlled object 150 by a detector 155 is applied to a subtractor 130. The subtractor 130 calculates the offset between a target value and the detected controlled variable, and the offset is inputted to the control apparatus 131–135. It Goes without saying that the controlled variable may be of a plurality of types, and not just of one type. The controlled variable detected by the detector 155 is converted into a signal or data of a suitable form by an input circuit 154, after which it is applied to a fuzzy reasoning circuit 151. The fuzzy reasoning circuit 151, of either analog or digital type, may be one which possesses an architecture dedicated to fuzzy reasoning, or can be realized by a general-purpose binary digital computer.

The output signals outputted by the control apparatus 131–135 for controlling the controlled object enter corresponding coefficient units 141–145 (reference numerals 143, 144 are assigned to two of these coefficient units that are not shown). The coefficient units 141–145 output their respective inputs upon multiplying them by a prescribed coefficient (the coefficients take on values between 1 and 0). The input signal is delivered as an output signal without change when the coefficient is 1, and passage of the input signal through the unit is forbidden when the coefficient is 0. Accordingly, when the coefficients take on a value of 1 or 0, the coefficient units 141–145 act as gate circuits. The output signals of the coefficient units 141–145 are added by an adder 140, and the sum is applied to the controlled object as a manipulated variable.

A selection mode and a distribution mode are available for control of the coefficient units 141–145. The selection mode makes any one coefficient from among those of the five coefficient units 141–145 equal to 1, and makes the coefficients of the other coefficient units equal to 0. That is, the coefficient units 141–145 function as gate circuits, one of which is enabled and the other four of which are disabled. In the distribution mode, coefficients other than 1 and 0 are applied to at least two of the coefficient units 141–145 (the sum of the applied coefficients is always 1), and the coefficients of the other coefficient units (if there are any) are made 0. In the distribution mode, the manipulated variables outputted by the plurality of control apparatus are weighted and added.

Either the selection mode or the distribution mode is set by a mode setting unit 152. when the selection mode has been set, the control apparatus to be selected also is set by the mode setting unit 152. A signal representing the set mode is applied to a coefficient setting unit 153. The coefficients in the distribution mode are decided in a fuzzy reasoning unit 151. The coefficient setting unit 153 controls the coefficient units 141–145 in such a manner that when the selection mode has been set, the coefficient of the coefficient unit corresponding to the selected control apparatus is made 1, and the coefficients of all other coefficient units are made 0. When the distribution mode has been set, the coefficient setting unit 153 provides each of the coefficients 141–145 with the coefficients decided in the fuzzy reasoning circuit 151.

Fuzzy reasoning for deciding coefficients performed in the fuzzy reasoning circuit 151 will be described next.

Figure 12:
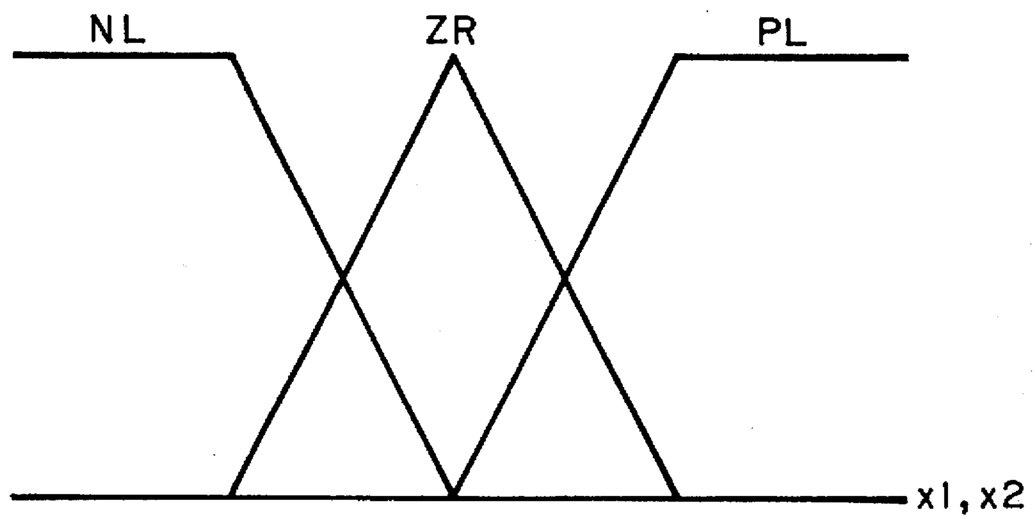

Let x1, x2 represent input data applied to the fuzzy reasoning circuit 151 via the input circuit 154. Both items of input data x1, x2 may be controlled quantities (e.g., temperature, velocity, etc.) detected by a detector 155, the input data x1 may be a controlled variable, and the input data x2 may be a differentiated value (or an integrated value) thereof. An example of membership functions of these items of input data x1 and x2 is illustrated in FIG. 12. PL, ZR and NL represent positive large, approximately zero and negative large, respectively. The items of input data x1, x2 take on positive and negative values.

Figure 13:
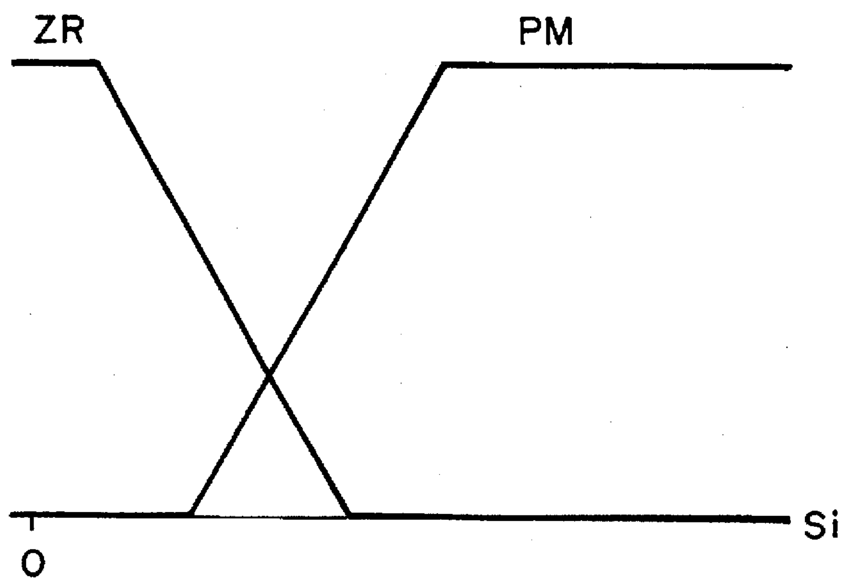

Let the coefficients applied to the coefficient units 141, 142, 143, 144 and 145 in the distribution mode be represented by S1, S2, S3, S4 and S5, respectively. An example of membership functions for the coefficient Si (i=1–5) is shown in FIG. 13. Here ZR and PM represent approximately zero and positive large, respectively. The coefficient Si is zero or takes on a positive value.

FIGS. **14*a*, 14*b*, 14*c*, 14*d* and 14*e* illustrate examples of rules, in table form, that are for deciding the coefficients S1, S2, S3, S4 and S5 in conformity with the input data x1, x2. For example, the upper left column in FIG. 14*a*** represents the following rule: "If x is NL and x2 is PL, then make S1 PM.".

Overall, the rule illustrated in FIG. **14*a*** states that if x1 is very large and negative and x2 is very large and positive, then the coefficient S1 should be made large, and that the coefficient S1 should be made approximately zero in other cases.

Overall, the rule illustrated in FIG. **14*b*** states that if x1 is very large and positive and x2 is very large and positive, then the coefficient S2 should be made large, and that the coefficient S2 should be made approximately zero in other cases.

Overall, the rule illustrated in FIG. **14*c*** states that if x1 is very large and negative and x2 is very large and negative, then the coefficient S3 should be made large, and that the coefficient S3 should be made approximately zero in other cases.

Overall, the rule illustrated in FIG. **14*d*** states that if x1 is very large and positive and x2 is very large and negative, then the coefficient S4 should be made large, and that the coefficient S4 should be made approximately zero in other cases.

Figures 14A, 14B, 14C, 14D, 14E:
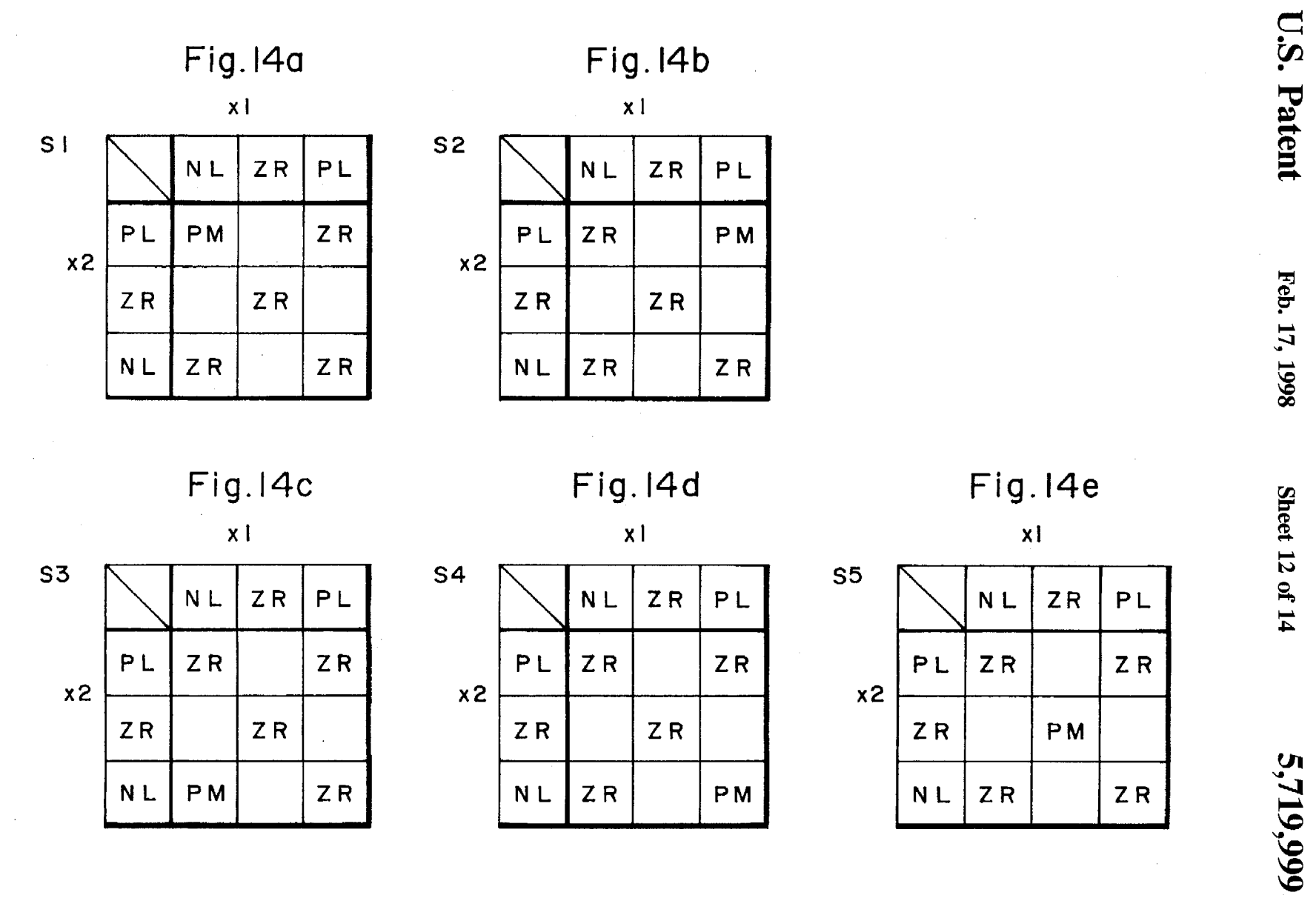

Overall, the rule illustrated in FIG. 14e states that if x1 is in the vicinity of zero and and x2 in the vicinity of zero, then the coefficient S5 should be made large, and that the coefficient S5 should be made approximately zero in other cases.

Figure 15:
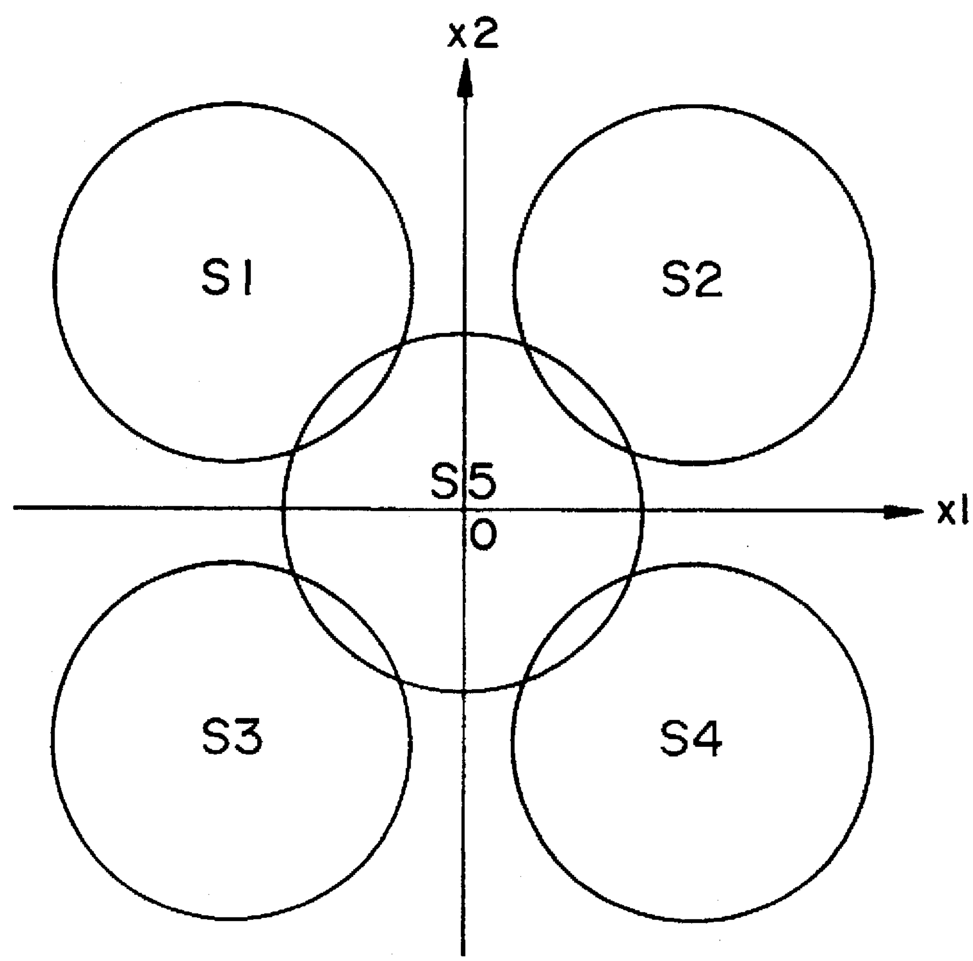

More specifically, these rules are set in such a manner that the coefficients S1–S4 become dominant in first through fourth quadrants in a rectangular-coordinate plane in which x1 is taken along the horizontal axis and x2 is taken along the vertical axis, as shown in FIG. 15, and the coefficient S5 becomes dominant in the vicinity of the origin of the coordinate system. Areas in which respective ones of the five control apparatus 131–135 operate effectively are set, and these apparatus control the single controlled object 150 by role sharing.

The results of reasoning in accordance with the aforesaid rules are eventually defuzzified, and the coefficients of the coefficient units 141–145 are decided. At this time, it is preferred that the total of the five coefficients be adjusted to equal 1. This adjustment may be carried out by the coefficient setting unit 153.

In the above-described embodiment, the membership functions are illustrated as being of very few types, as shown in FIGS. 12 and 13, in order to simplify the description. It goes without saying that the types of membership functions can be made very large. This would be attended by a somewhat greatly complexity for the rules shown in FIGS. 14a–14e.

Figure 16:
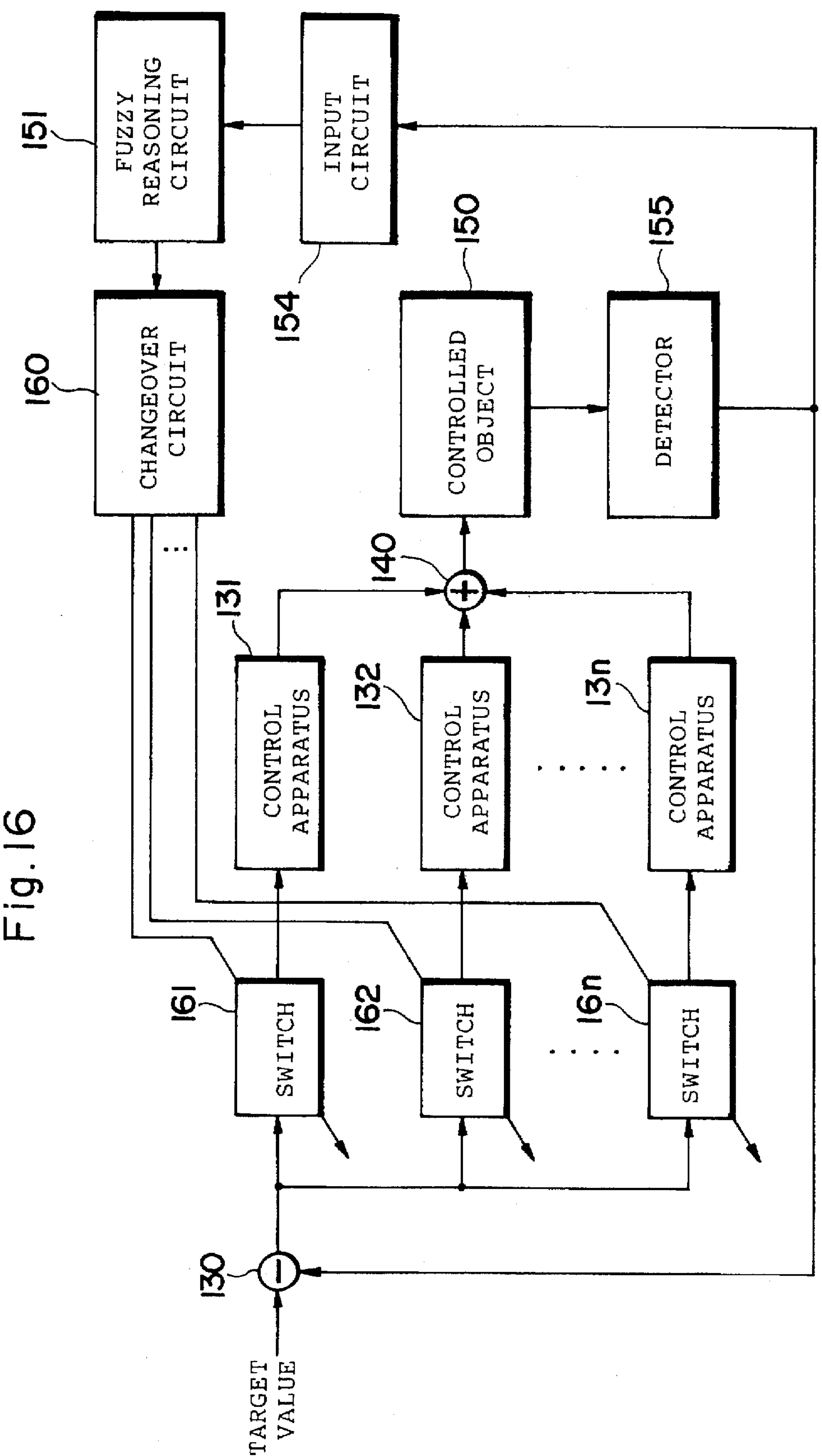

FIG. 16 illustrates another embodiment. In FIG. 16, portions identical with those shown in FIG. 11 are designated by like reference characters and a description thereof is deleted.

In this embodiment, n-number of control apparatus 131–13n are provided, and the outputs from these apparatus are applied to an adder 140. An offset signal outputted by a subtractor 130 enters the control apparatus 131–13n via respective switching circuits 161–16n provided for corresponding ones of the control apparatus 131–13n. On the basis of the results of reasoning by the fuzzy reasoning circuit 151, the switching circuits 161–16n are controlled by a changeover circuit 160 in such a manner that one is turned on and all of the others are turned off. Accordingly, the output signal of any one of the control apparatus is applied to the controlled object as a manipulated variable via an adder 140.

The fuzzy reasoning in the fuzzy reasoning circuit 151 is executed in the same manner as described with reference to FIGS. 12 through 14e. The switching circuit corresponding to the coefficient having the maximum value resulting from reasoning is turned on.

In FIG. 16, the coefficient units shown in FIG. 11 can be used instead of the switching circuits. Conversely, the coefficient units of FIG. 11 may be replaced by switching circuits.

Instead of making the coefficient of a coefficient unit 0 or turning a switching circuit off, or in addition thereto, a control apparatus in which the control signal is not being utilized in order to control the controlled object may be placed in a non-operating state.

INDUSTRIAL APPLICABILITY

The fuzzy control apparatus in which a rule is capable of being changed, the method of operating the same, the control system in which changeover is controlled by fuzzy reasoning, and the control method this system, which are in accordance with the present invention, are well suited for use in automatic control of temperature, velocity and may other quantities.

What is claimed is:

1. A control apparatus having a plurality of control means whose control methods for controlling a controlled object differ from one another, comprising:

means for storing a control output of control means operating immediately prior to a changeover;

synthesizing output means for combining the stored control output which prevails immediately prior to the changeover and a control output of control means which starts operating after the changeover, and outputting a combined control output to be applied to the controlled object; and changeover control means for altering a combining ratio of said synthesizing output means in such a manner that, with passage of time from a moment at which the changeover of control means is made, there is a gradual decrease in a percentage of the control output which prevailed immediately prior to the changeover, and a gradual increase in a percentage of the control output which prevails following the changeover, in the combined control output of said synthesizing output means, and for outputting, as the combined control output, and upon passage of a predetermined time from the moment of the changeover, the control output which prevails following the changeover.

2. The control apparatus of claim 1 wherein said control means are changed over during operation.

3. A method of operating a control apparatus in which control by a plurality of control methods for controlling a controlled object is possible, comprising:

storing a control output which prevails immediately prior to a control-method change when a control-method change is made;

generating a combined control output by combining, after the control-method change, the stored control output which prevailed immediately prior to the control-method change and a control output which prevails following the control-method change, and altering a combining ratio in such a manner that, with passage of time from a moment at which the control-method change is made, there is a gradual decrease in a percentage of the control output which prevailed immediately prior to the control-method change, and a gradual increase in a percentage of the control output which prevails following the control-method change, in the combined control output; and outputting, as the combined control output, and upon passage of a predetermined time from the moment at which the control-method change is made, the control output which prevails following the control-method change.

4. The method of operating a control apparatus of claim 3, wherein a control method is changed and in which said plurality of control methods are changed during operation.

5. A control apparatus having a plurality of control means whose control methods for controlling a controlled object differ from one another, in which a predetermined number of the control means among the plurality thereof are operated, a combined output obtained by combining control outputs from these operated control means is outputted as a manipulated variable to be applied to the controlled object, comprising:

means for determining whether influence which said combined output receives from the control output of the control means which is to be rendered inoperative by the changeover falls within predetermined allowable limits; and changeover control means for making a changeover in such a manner that when said influence falls within said predetermined allowable limits, the control means is rendered inoperative and inoperative new control means is rendered operative, and when said influence falls outside said predetermined allowable limits, changeover of control means is forbidden.

6. The control apparatus of claim 5 wherein one of said control means is changed over and replaced by another control means, which is inoperative, during operation.

7. A method of operating a control apparatus in which a plurality of control rules which differ from one another for controlling a controlled object are set, a predetermined number of the control rules among the plurality thereof are rendered active, a combined output obtained by combining control outputs obtained from the rules rendered active is outputted as a manipulated variable to be applied to the controlled object, comprising:

determining whether influence which said combined output receives from the control output obtained from the control rule which is to be rendered inactive by the change falls within predetermined allowable limits; and making a change in such a manner that when said influence falls within said predetermined allowable limits, the control rule is rendered inactive and an inactive new control rule is rendered active, and when said influence falls outside said predetermined allowable limits, the change of the control rule is forbidden.

8. The method of operating a control apparatus of claim 7 wherein one of said control rules is changed to another control rule, which is inactive, during operation.

* * * * *